(12) United States Patent
Matsumoto et al.

(10) Patent No.: US 11,554,644 B2
(45) Date of Patent: Jan. 17, 2023

(54) AIR PURIFICATION APPARATUS FOR VEHICLE

(71) Applicant: HONDA MOTOR CO., LTD., Tokyo (JP)

(72) Inventors: Subaru Matsumoto, Wako (JP); Shinji Kakizaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 530 days.

(21) Appl. No.: 16/718,229

(22) Filed: Dec. 18, 2019

(65) Prior Publication Data

US 2020/0223293 A1 Jul. 16, 2020

(30) Foreign Application Priority Data

Jan. 16, 2019 (JP) .............................. JP2019-005243

(51) Int. Cl.
*B01D 53/02* (2006.01)
*B60H 3/06* (2006.01)
(Continued)

(52) U.S. Cl.
CPC ........... *B60H 3/0658* (2013.01); *B01D 53/04* (2013.01); *B60H 3/0035* (2013.01); *B01D 2253/102* (2013.01); *B01D 2259/4566* (2013.01)

(58) Field of Classification Search
CPC ........ B01D 2253/102; B01D 2257/504; B01D 2257/80; B01D 2259/4566; B01D 53/04;
(Continued)

(56) References Cited

U.S. PATENT DOCUMENTS 3,242,651 A * 3/1966 Arnoldi .................. B01D 53/04
96/372
4,046,529 A * 9/1977 Fletcher ............. B01D 53/0438
96/127
(Continued)

FOREIGN PATENT DOCUMENTS

CN  101535070  9/2009
DE  19955253  6/2001
(Continued)

OTHER PUBLICATIONS

Japanese Office Action for Japanese Patent Application No. 2019-005243 dated Mar. 8, 2022.
(Continued)

*Primary Examiner* — Christopher P Jones
(74) *Attorney, Agent, or Firm* — Amin, Turocy & Watson, LLP

(57) ABSTRACT

An air purification apparatus includes an adsorption unit, a purification passage, and a regeneration passage. The adsorption unit adsorbs carbon dioxide and water vapor in air. The purification passage introduces air in a passenger compartment into the adsorption unit, and returns air, from which the carbon dioxide and the water vapor are adsorbed and removed by the adsorption unit, into the passenger compartment. The regeneration passage introduces air for regeneration into the adsorption unit, and discharges used air for regeneration obtained by regenerating the adsorption unit to an outside of the vehicle. An upstream side of the adsorption unit of the regeneration passage and the purification passage is constituted by an internal air introduction pipeline configured to introduce air from the passenger compartment.

11 Claims, 13 Drawing Sheets

(51) Int. Cl.
*B60H 3/00* (2006.01)
*B01D 53/04* (2006.01)

(58) Field of Classification Search
CPC ............. B01D 53/0446; B60H 3/0035; B60H 3/0633; B60H 3/0658; Y02C 20/40
See application file for complete search history.

(56) References Cited

U.S. PATENT DOCUMENTS

| | | | |
|---|---|---|---|
| 4,530,817 A * | 7/1985 | Holter | B01D 53/00 422/171 |
| 5,620,367 A | 4/1997 | Khelifa | |
| 6,142,151 A * | 11/2000 | Dean | B01D 53/0446 128/205.24 |
| 7,316,731 B2 | 1/2008 | Farant et al. | |
| 10,507,424 B1 * | 12/2019 | Müller-Hellwig | B01D 53/0462 |
| 10,646,815 B2 | 5/2020 | Luisman et al. | |
| 10,898,850 B2 * | 1/2021 | Matsumoto | B01D 53/0454 |
| 11,110,386 B2 * | 9/2021 | Matsumoto | B60H 3/0633 |
| 2012/0241127 A1 * | 9/2012 | Watanabe | B60H 1/00564 62/271 |
| 2015/0273974 A1 * | 10/2015 | Levin | F25B 30/04 62/438 |
| 2015/0298043 A1 * | 10/2015 | Meirav | B01D 53/04 96/111 |

FOREIGN PATENT DOCUMENTS

| | | |
|---|---|---|
| EP | 0745419 | 4/1996 |
| JP | 04-135611 | 5/1992 |
| JP | 04-250812 | 9/1992 |
| JP | 05-137941 | 6/1993 |
| JP | 08-067136 | 3/1996 |
| JP | 2006-010307 | 1/2006 |
| JP | 2017-528316 | 9/2017 |
| JP | 2000-146220 | 5/2020 |
| WO | 2016-038340 | 3/2016 |

OTHER PUBLICATIONS

Indian Office Action for Indian Patent Application No. 202044000638 dated May 27, 2021.
Japanese Notice of Allowance for Japanese Patent Application No. 2019-005243 dated Aug. 9, 2022.
Chinese Office Action for Chinese Patent Application No. 201911335393.0 dated Nov. 3, 2022.

* cited by examiner

AIR PURIFICATION APPARATUS FOR VEHICLE

CROSS-REFERENCE TO RELATED APPLICATION

Priority is claimed on Japanese Patent Application No. 2019-005243, filed Jan. 16, 2019, the content of which is incorporated herein by reference.

BACKGROUND OF THE INVENTION

Field of the Invention

The present invention relates to an air purification apparatus for a vehicle configured to adsorb purifying target materials in a passenger compartment and purify air in the passenger compartment.

Description of Related Art

An air purification apparatus for a vehicle is known to adsorb purifying target materials in a passenger compartment using an adsorption unit in which an adsorbent such as activated carbon or the like is carried. The air purification apparatus has a configuration of taking the air in the passenger compartment into a casing, and returning the air purified after adsorbing the purifying target materials in the air using the adsorption unit to the passenger compartment.

In the adsorption unit disposed in the casing, a concentration of the adsorbed purifying target materials increases and an adsorption capacity gradually decreases as time elapses. As a countermeasure therefor, a configuration of causing air for regeneration to flow through the adsorption unit and regenerating the adsorption unit using the air for regeneration has been disclosed (for example, see Published Japanese Translation No. 2017-528316 of the PCT International Publication).

The air purification apparatus disclosed in Published Japanese Translation No. 2017-528316 of the PCT International Publication includes a pair of adsorption units, a purification passage configured to introduce the air in the passenger compartment into either one of the adsorption units and return purified air, from which purifying target materials have been removed by the adsorption unit, to the passenger compartment, and a regeneration passage configured to introduce the air for regeneration to the other of the adsorption units and discharge used air for regeneration obtained by performing regeneration of the adsorption unit outside of the vehicle. The air purification apparatus further includes a switching valve configured to selectively connect each of the adsorption units to either the purification passage or the regeneration passage, and the other adsorption unit can be regenerated while purification of indoor air is performed by the one adsorption unit. Air purification by the adsorption unit and regeneration of the adsorption unit are switched between using a switching valve at fixed time intervals.

In addition, in the air purification apparatus disclosed in Published Japanese Translation No. 2017-528316 of the PCT International Publication, external air as the air for regeneration is introduced into the adsorption unit, and the air for regeneration is heated by a heater or the like during regeneration of the adsorption unit. Accordingly, the purifying target materials adsorbed by the adsorption unit are easily separated from the adsorption unit, and discharged outside of the vehicle with the used air for regeneration.

SUMMARY OF THE INVENTION

However, in the air purification apparatus disclosed in Published Japanese Translation No. 2017-528316 of the PCT International Publication, since external air is introduced during regeneration of the adsorption unit, there is a need to provide an internal air introduction pipeline configured to introduce air from the passenger compartment and an external air introduction pipeline configured to introduce outside air upstream from the adsorption unit in the vehicle, and pipelines of the adsorption unit on an intake-side thus become complicated.

In addition, since the air purification apparatus disclosed in Published Japanese Translation No. 2017-528316 of the PCT International Publication has a structure in which external air is introduced during regeneration of the adsorption unit, a lot of energy is required to raise the temperature of the air for regeneration (external air) to a desired temperature or higher during severe cold weather in which an external air temperature is low. In addition, when the air for regeneration is not heated, the regeneration efficiency of the adsorption unit decreases. For this reason, improvement is also desired from the viewpoint of improvement of regeneration efficiency of the adsorption unit and effective use of in-vehicle energy.

An aspect of the present invention is directed to providing an air purification apparatus for a vehicle in which the regeneration efficiency of an adsorption unit is able to be improved while a pipeline structure of the adsorption unit on an intake-side is able to be simplified and consumption of in-vehicle energy is minimized.

An air purification apparatus for a vehicle according to the present invention employs the following configurations.

(1) An air purification apparatus for a vehicle according to an aspect of the present invention includes an adsorption unit configured to adsorb carbon dioxide and water vapor in air; a purification passage configured to introduce air in a passenger compartment into the adsorption unit and to return air, from which carbon dioxide and water vapor have been adsorbed and removed by the adsorption unit, to the passenger compartment; and a regeneration passage configured to introduce air for regeneration into the adsorption unit and to discharge used air for regeneration obtained by regenerating the adsorption unit outside of the vehicle, wherein upstream side of the adsorption unit of the regeneration passage and the purification passage is constituted by an internal air introduction pipeline configured to introduce air from the passenger compartment.

According to the configuration of the above-mentioned (1), when the air in the passenger compartment is purified, the air in the passenger compartment is introduced into the adsorption unit from the internal air introduction pipeline, and the air purified by the adsorption unit is returned into the passenger compartment. In addition, when the adsorption unit is regenerated, the air in the passenger compartment as the air for regeneration is introduced into the adsorption unit from the internal air introduction pipeline. The used air for purification obtained by regenerating the adsorption unit is discharged to the outside of the vehicle.

In the case of the present invention, since the air in the passenger compartment is introduced as the air for regeneration not only into the purification passage but also into the regeneration passage, an intake-side pipeline structure is simplified.

In addition, the air in the passenger compartment introduced in the adsorption unit as the air for regeneration has a higher temperature than that of the external air during wintertime. For this reason, the carbon dioxide or the water vapor can be easily separated from the adsorption unit during regeneration of the adsorption unit. In addition, in order to scatter the carbon dioxide or the water vapor more easily from the adsorption unit, when the air introduced into the adsorption unit is heated by the heating apparatus or the like, the amount of consumption of electrical energy or the like can be minimized by increasing the temperature to the same temperature as in a case in which external air is used.

(2) In the aspect of the above-mentioned (1), the air purification apparatus may include a plurality of adsorption units, and the internal air introduction pipeline may branch into a plurality of parts and may be connected to the adsorption units.

In this case, since there is no need to install an elongated internal air introduction pipeline in each of the adsorption units, a space occupied by pipelines in the vehicle on a suction side can be reduced, and reduction in overall size and weight of the apparatus can be achieved.

(3) In the aspect of the above-mentioned (2), an air introduction fan configured to introduce air in the passenger compartment may be disposed in an upstream section of the internal air introduction pipeline.

In this case, the same air introduction fan can be shared in purification of the air in the passenger compartment with the adsorption unit and regeneration of the adsorption unit. For this reason, the number of parts can be reduced, which is advantageous in reducing manufacturing costs or reducing the size and weight of the apparatus.

(4) In the aspect of the above-mentioned (2) or (3), an intake distribution mechanism configured to adjust a ratio between air volumes distributed to the respective adsorption units from the internal air introduction pipeline may be disposed on a branch-off section of the internal air introduction pipeline.

In this case, air purification by one adsorption unit and regeneration of the other adsorption unit can be performed simultaneously in proportions according to this air ratio by appropriately changing the air introduction ratio for the respective adsorption units using the intake distribution mechanism. Further, by setting the proportion of the amount of air distributed to one adsorption unit to 0%, it is possible to stop the purification of indoor air by this one adsorption unit or the execution of regeneration by this one adsorption unit.

(5) In the aspect of any one of the above-mentioned (2) to (4), an upstream side of the adsorption units next to each other may be partitioned into two branch-off passages by a partition wall, and a heating apparatus configured to heat the air before introduction into the adsorption unit during regeneration of the adsorption unit may be installed in each of the branch-off passages.

In this case, for example, when regenerating one adsorption unit, air heated to a predetermined temperature is able to be made to flow to one adsorption unit by operating a heating device installed upstream of the adsorption unit. Accordingly, the regeneration efficiency of the adsorption unit can be further enhanced. In this case, since the heating apparatus increases the temperature of the air in the passenger compartment having a high temperature of a certain level or more other than the cooled external air, consumption of in-vehicle energy can be minimized.

(6) In the aspect of any one of the above-mentioned (2) to (5), the upstream side of the adsorption units next to each other may be partitioned into two branch-off passages by the partition wall, and a cold/heat supply apparatus configured to heat the air in the branch-off passage on one side and cool the air in the branch-off passage on the other side may be installed on the partition wall.

In this case, the air in the branch-off passage on the side at which regeneration of the adsorption unit is performed can be heated by operating the cold/heat supply apparatus, and the air in the branch-off passage on the side at which adsorption of carbon dioxide and water vapor is performed by the adsorption unit can be cooled. Accordingly, regeneration efficiency of the one adsorption unit can be enhanced, and adsorption efficiency of the carbon dioxide and the water vapor by the other adsorption unit can be enhanced.

(7) In the aspect of any one of the above-mentioned (2) to (6), a return pipeline that constitutes a part of the purification passage and a vehicle-outside discharge pipeline that constitutes a part of the regeneration passage may be connected to a downstream side of each of the adsorption units, and a flow path switching mechanism configured to selectively connect the downstream side of each of the adsorption units to any one of the return pipeline and the vehicle-outside discharge pipeline may be provided.

In this case, when purification of the air in the passenger compartment is performed by the one adsorption unit, the downstream side of the one adsorption unit is connected to the return pipeline by the flow path switching mechanism. Accordingly, the air, from which carbon dioxide and water vapor are removed by the one adsorption unit, is returned into the passenger compartment through the return pipeline. In addition, when regeneration of the one adsorption unit is performed, the downstream side of the one adsorption unit is connected to the vehicle-outside discharge pipeline by the flow path switching mechanism. Accordingly, the used air for regeneration obtained through purification of the adsorption unit is discharged to the outside of the vehicle through the vehicle-outside discharge pipeline.

(8) In the aspect of the above-mentioned (7), the flow path switching mechanism may include an actuator operated to connect the downstream side of the adsorption unit to the return pipeline during adsorption by the adsorption unit and connect the downstream side of the adsorption unit to the vehicle-outside discharge pipeline during regeneration of the adsorption unit.

In this case, the air, from which carbon dioxide and water vapor are removed by the adsorption unit, can be returned into the passenger compartment by an appropriate operation of the flow path switching mechanism by the actuator, and the used air for regeneration obtained through regeneration of the adsorption unit can be discharged to the outside of the vehicle.

(9) In the aspect of any one of the above-mentioned (2) to (8), the downstream sides of the adsorption units next to each other may be partitioned from each other by the partition wall, and a heat transfer apparatus configured to transmit heat of air on the downstream side of one of the adsorption units next to each other to air on the downstream side of the other one of the adsorption units next to each other may be installed on the partition wall.

In this case, unnecessary heat of the air downstream from the one adsorption unit can be transmitted to the air downstream from the other adsorption unit, and heat can be effectively used.

(10) In the aspect of the above-mentioned (9), the heat transfer apparatus may be configured to transmit heat of used air for regeneration, which has performed regeneration of the adsorption unit and which is before being discharged to the outside of the vehicle, to air which has performed adsorption by the adsorption unit and which is before being returned into the passenger compartment.

In this case, a heat quantity of the air cooled while being returned into the passenger compartment through the return pipeline can be supplemented by the heat transmitted through the heat transfer apparatus. For this reason, since the heat discharged to the outside of the vehicle can be effectively used, unnecessary consumption of in-vehicle energy can be minimized.

In the aspect of the present invention, since the upstream side of the adsorption unit of the regeneration passage and the purification passage is constituted by the internal air introduction pipeline configured to introduce the air in the passenger compartment, in comparison with the case in which the pipeline configured to introduce external air is provided in the purification passage, an intake-side pipeline structure of the adsorption unit can be simplified.

In addition, in the aspect of the present invention, since the air in the passenger compartment having a relatively high temperature is introduced as air for regeneration, regeneration efficiency of the adsorption unit can be improved while minimizing consumption of in-vehicle energy.

DETAILED DESCRIPTION OF THE INVENTION

Figure 1:
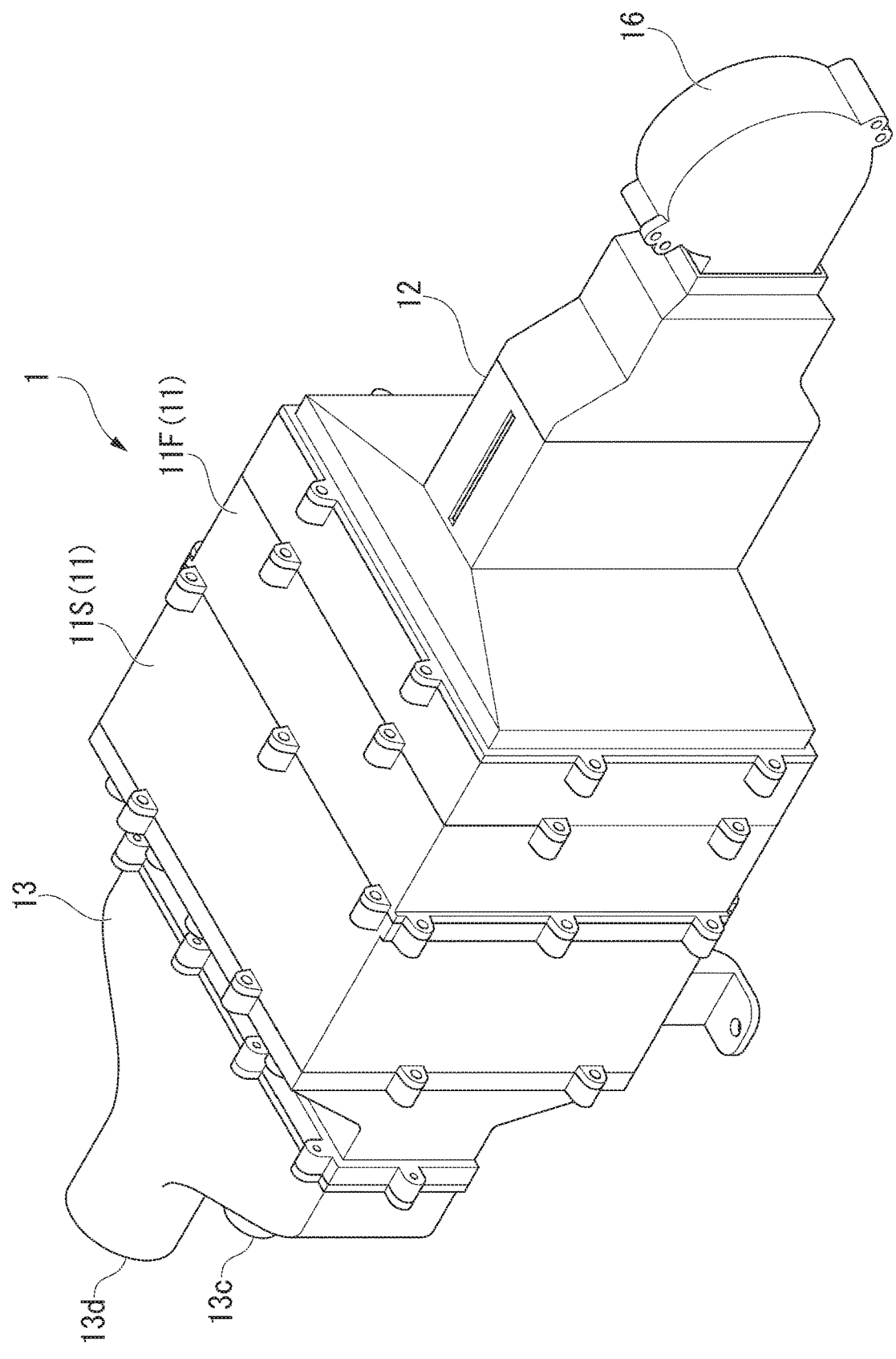
FIG. 1 is a perspective view of an air purification apparatus of a first embodiment.

Hereinafter, embodiments of the present invention will be described on the basis of the accompanying drawings. Further, in the embodiments described below, common portions are designated by the same reference numerals, and overlapping description thereof will be omitted.

First Embodiment

Figure 2:
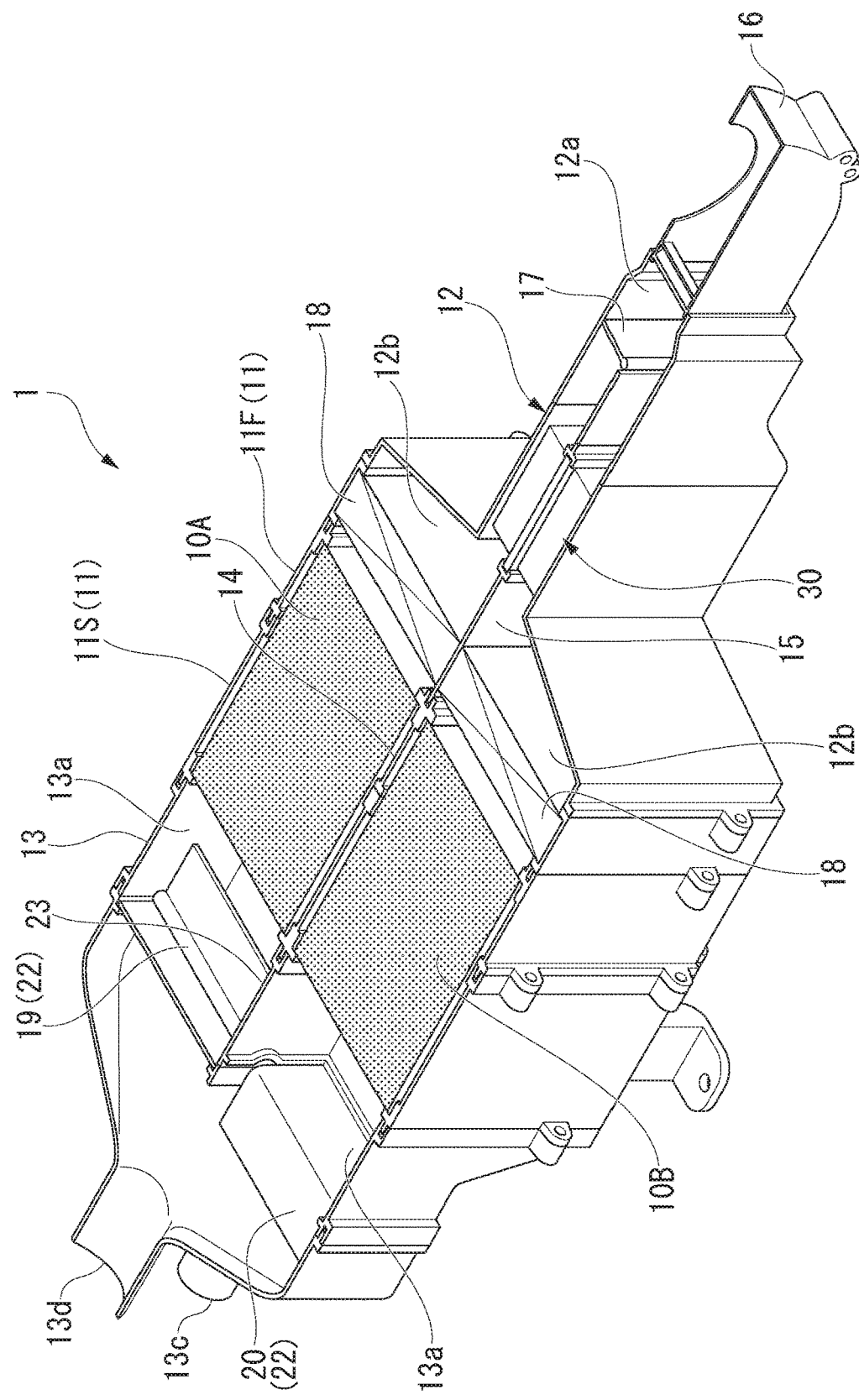
FIG. 2 is a partial cross-sectional perspective view of the air purification apparatus of the first embodiment.
Figure 3:
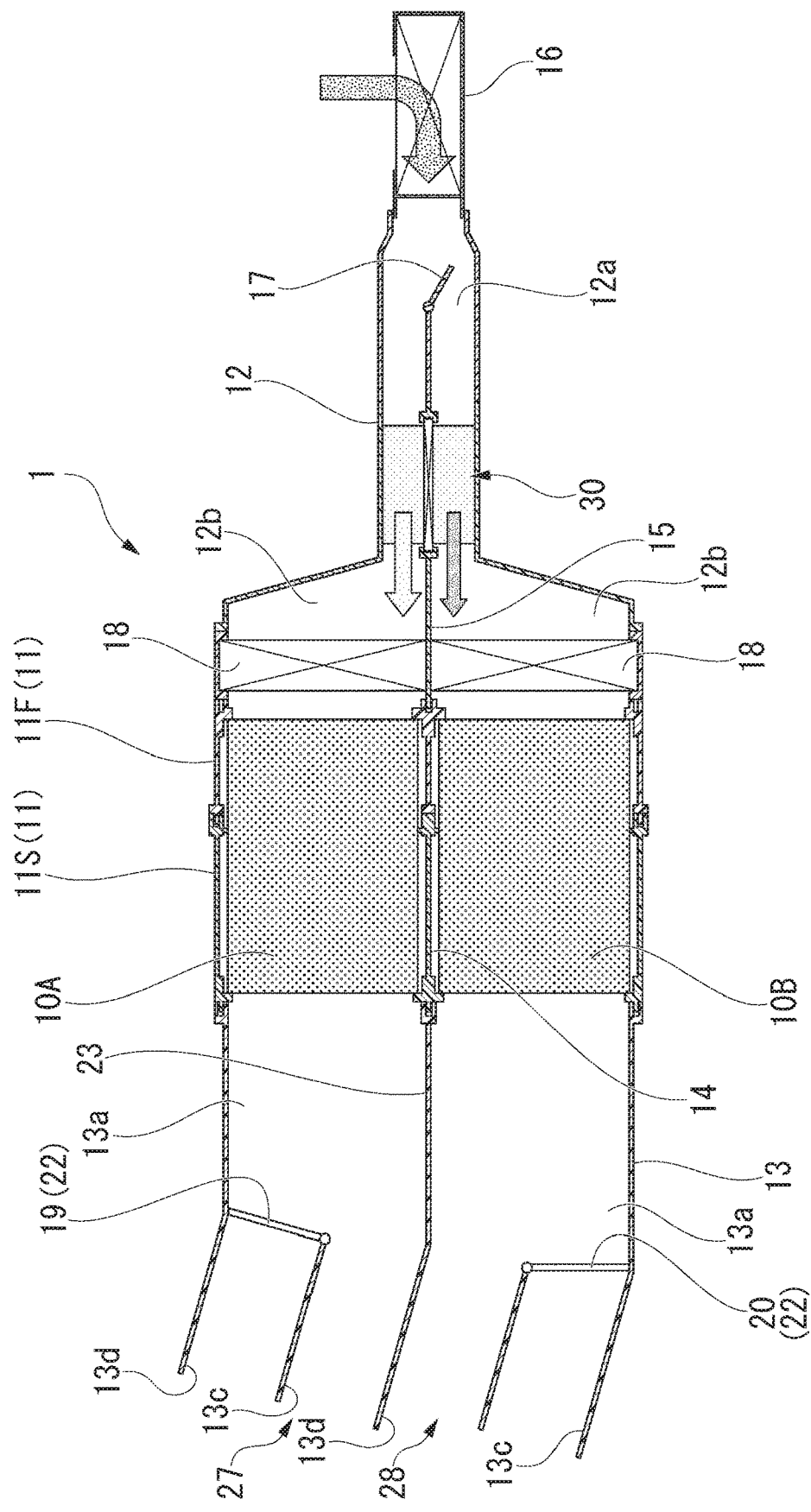
FIG. 3 is a schematic cross-sectional view of the air purification apparatus of the first embodiment.

FIG. 1 is a perspective view of an air purification apparatus 1 of a first embodiment, and FIG. 2 is a partial cross-sectional perspective view in which substantially an upper half section of the air purification apparatus 1 in FIG. 1 is removed. In addition, FIG. 3 is a schematic cross-sectional view of the air purification apparatus 1, showing an internal structure of the air purification apparatus 1.

The air purification apparatus 1 of the embodiment is an air purification apparatus configured to purify air in the passenger compartment of the vehicle, and is able to remove purifying target materials containing at least carbon dioxide and water vapor in the passenger compartment. The air purification apparatus 1 includes a pair of adsorption units 10A and 10B configured to circulate the air in the passenger compartment and adsorb the purifying target materials in the air, a rectangular tubular housing 11 configured to accommodate the adsorption units 10A and 10B therein, an upstream-side duct block 12 connected to one end side of the housing 11 and configured to introduce air, and a downstream-side duct block 13 connected to the other end side of the housing 11 and configured to discharge air.

The adsorption units 10A and 10B have adsorbent layers, through which the air can flow, disposed in the rectangular tubular unit case. For example, the adsorbent layer may have a structure in which an adsorbent such as synthetic zeolite or the like that can adsorb at least carbon dioxide and water vapor is carried by or impregnated in a base material.

Further, the adsorbent is not limited to synthetic zeolite. In addition, the adsorbent may consist of two components, i.e., a component that is able to adsorb carbon dioxide and a component that is able to adsorb water vapor (moisture).

As the adsorbent that adsorbs carbon dioxide, for example, activated carbon, zeolite, silicon oxide (silicon), barium orthotitanate, porous cerium oxide, polyamines, potassium carbonate, an amine solution, an amide/imide solution, an alcohol solution, an ether solution, a ketone solution, a carbonate solution, a lactone solution, a hydrocarbon solution, or the like, may be used.

As the adsorbent that is able to adsorb water vapor, for example, activated carbon zeolite, silica gel, or the like, may be used.

In addition, the adsorbent may be a liquid or a solid.

The housing 11 has a partition wall 14 formed therein along a flow direction of the air. The partition wall 14 divides the interior of the housing 11 into two accommodating chambers. The corresponding adsorption units 10A and 10B are disposed in the accommodating chambers, respectively. In addition, the housing 11 has a first housing 11F disposed on an upstream side in the flow direction of the air and a second housing 11S disposed on a downstream side in the flow direction of the air, and the first housing 11F and the second housing 11S are adhered to each other while end surfaces thereof abut each other.

In the embodiment, the upstream-side duct block 12 constitutes an internal air introduction pipeline configured to introduce the air from the passenger compartment. An air introduction fan 16 is assembled to an end portion of the upstream-side duct block 12 on an upstream side. The air introduction fan 16 introduces the air in the passenger compartment into the upstream-side duct block 12. The upstream-side duct block 12 has a collecting passage 12a into which the air is introduced from the air introduction fan 16, and two branch-off passages 12b branching off from the collecting passage 12a.

The two branch-off passages 12b are partitioned from each other by a partition wall 15 continuous with the partition wall 14 in the housing 11. The two branch-off passages 12b communicate with the corresponding adsorption units 10A and 10B in the housing 11. Accordingly, the air in the passenger compartment is introduced into the adsorption units 10A and 10B through the corresponding branch-off passages 12b.

An opening/closing door 17 (an air distribution mechanism) configured to switch introduction of the air is provided on an end portion of the two branch-off passages 12b on the side of the collecting passage 12a (a branch-off section of the internal air introduction pipeline). The opening/closing door 17 of the embodiment is operated at an arbitrary pivot position by an actuator (not shown) controlled by a control device. The opening/closing door 17 can adjust a ratio of an air volume distributed to the adsorption units 10A and 10B from the upstream-side duct block 12 (the internal air introduction pipeline).

A heating apparatus 18 configured to heat the air introduced into the branch-off passages 12b is interposed between sections close to upstream sides of the adsorption units 10A and 10B in the branch-off passages 12b. Any one of the heating apparatuses 18 disposed in the branch-off passages 12b is selectively heated. The heating apparatus 18 heats the air before introduction into the adsorption units 10A and 10B during regeneration of the adsorption units 10A and 10B. Accordingly, the air heated by the heating apparatus 18 is introduced into the adsorption units 10A and 10B during regeneration of the adsorption units 10A and 10B.

In addition, a cold/heat supply apparatus 30 configured to heat the air in one of the branch-off passages 12b and cool the air in the other of the branch-off passages 12b is installed on the partition wall 15 that partitions the branch-off passages 12b. The cold/heat supply apparatus 30 is disposed upstream from an installation section of the heating apparatus 18.

Figure 4:
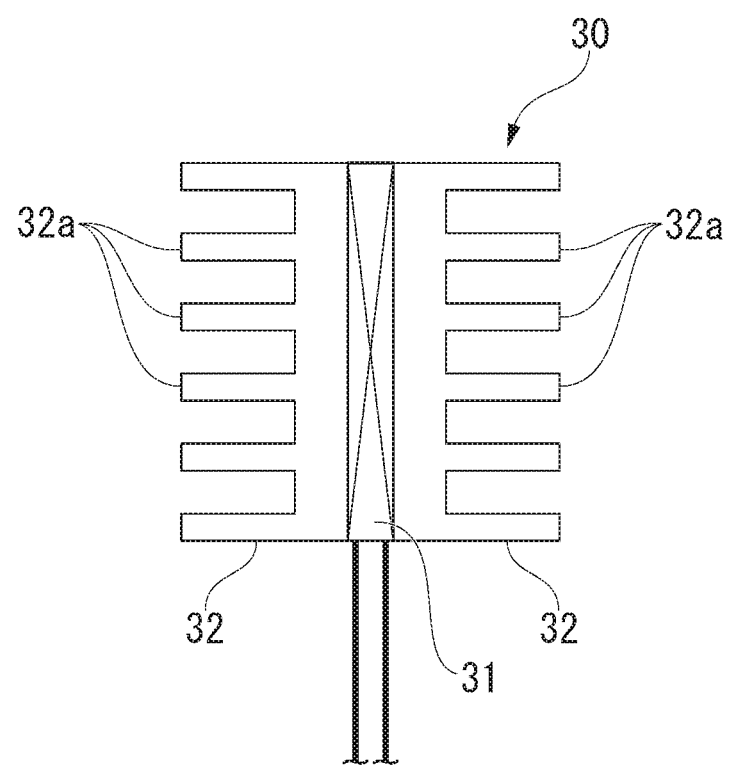
FIG. 4 is a front view of a cold/heat supply apparatus of the first embodiment.

FIG. 4 is a view showing an example of the cold/heat supply apparatus 30.

For example, as shown in FIG. 4, the cold/heat supply apparatus 30 includes a Peltier element 31 having a flat plate shape, and a pair of heat sinks 32 each having a plurality of fins 32a. The Peltier element 31 has front and back surfaces, one of which is heated and the other of which is cooled through electric conduction in one direction. In addition, in the Peltier element 31, one of the front and back surfaces is cooled and the other surface is heated when the conducting direction is reversed. The heat sinks 32 are bonded to the front surface and the back surface of the Peltier element 31 having a flat plate shape. In the embodiment, the Peltier element 31 is installed on the partition wall 15 to face the branch-off passages 12b next to each other to the front and back surfaces, and the heat sinks 32 are disposed in the branch-off passages 12b. The heat sinks 32 transmit hot or cold heat from the Peltier element 31 according to conduction to the Peltier element 31. The heat sinks 32 exchange heat with the air introduced into the branch-off passages 12b, and thus, the air passing through one of the branch-off passages 12b is heated and the air passing through the other of the branch-off passages is cooled.

The downstream-side duct block 13 has two communication paths 13a communicating with the corresponding adsorption units 10A and 10B in the housing 11, a return pipeline 13c configured to return the purified air into the passenger compartment, and a vehicle-outside discharge pipeline 13d configured to discharge the air used for regeneration of the adsorption units 10A and 10B to the outside of the vehicle. The two communication paths 13a are partitioned from each other by a partition wall 23 continuous with the partition wall 14 in the housing 11.

Each of the communication paths 13a is selectively connectable to the return pipeline 13c and the vehicle-outside discharge pipeline 13d via a flow path switching mechanism 22.

In addition, in FIG. 3, in order to make the structure of the passages easier to understand, for convenience, two return pipelines 13c and two vehicle-outside discharge pipelines 13d are shown to be connected to each of the communication paths 13a.

Figure 5:
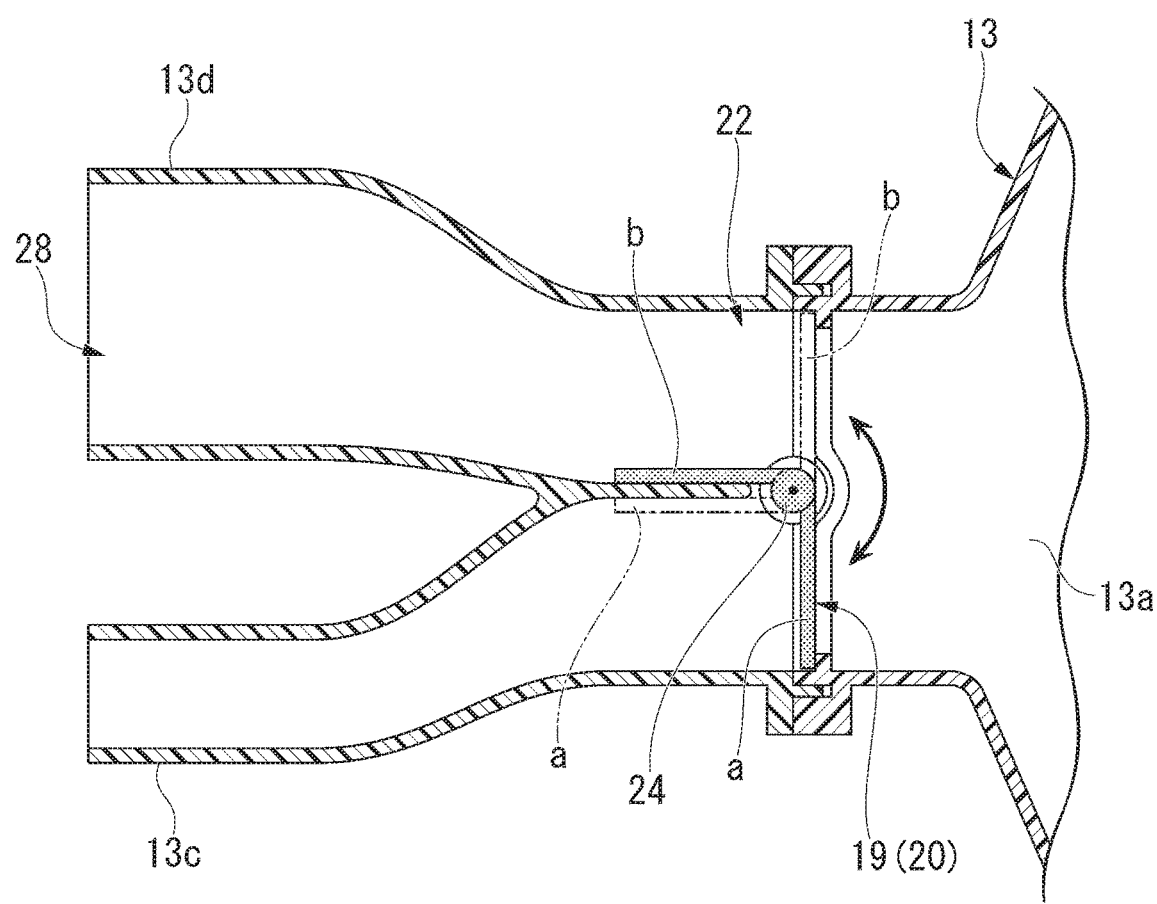
FIG. 5 is a longitudinal cross-sectional view of a portion of the air purification apparatus of the first embodiment downstream from an adsorption unit.
Figure 6:
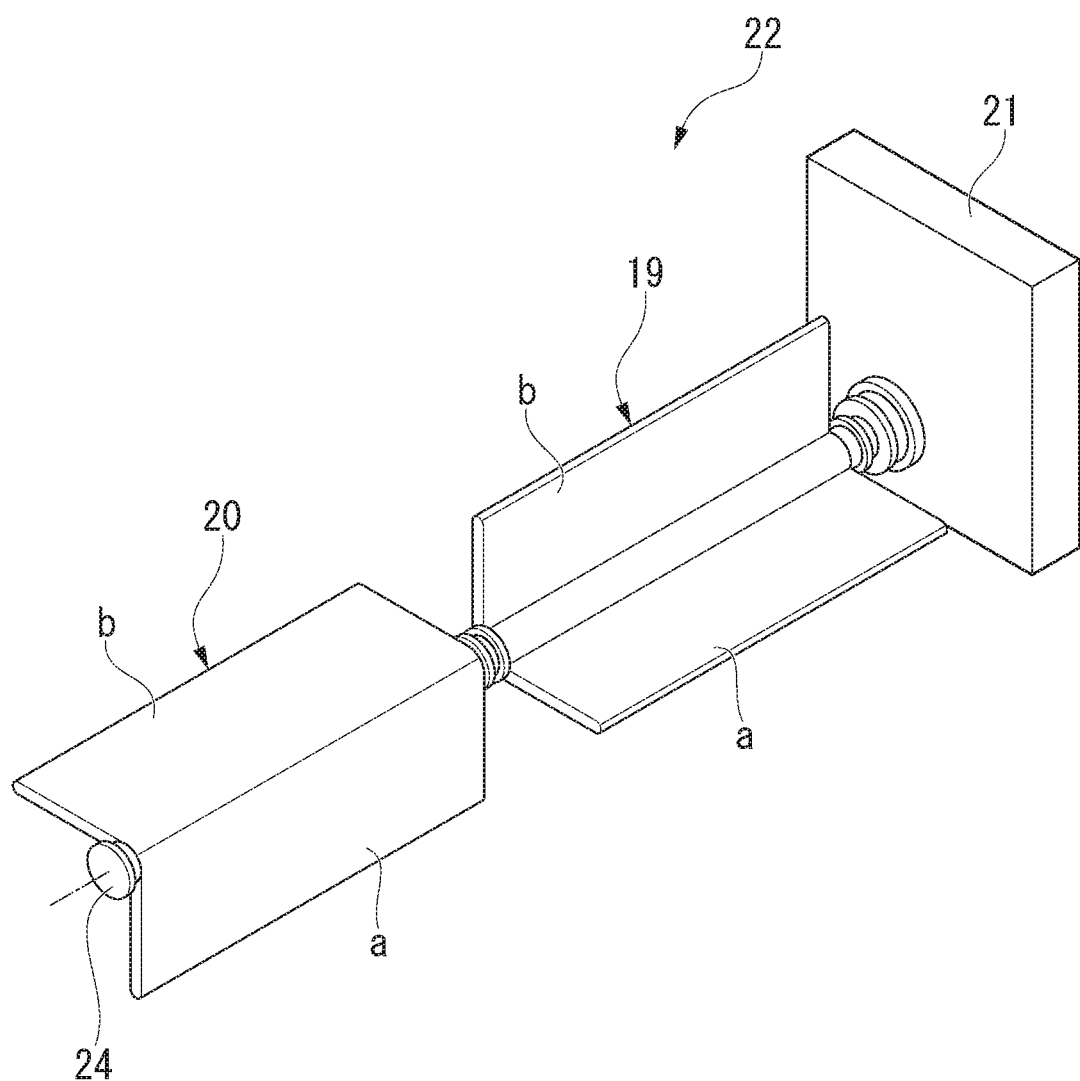
FIG. 6 is a perspective view showing a flow path switching mechanism of the first embodiment.

FIG. 5 is a cross-sectional view showing a detailed structure of the flow path switching mechanism 22, and FIG. 6 is a perspective view showing components of the flow path switching mechanism 22.

The flow path switching mechanism 22 includes an opening/closing door 19 (20) supported by a pivot shaft 24, and an actuator 21 such as a motor or the like configured to pivotably operate the pivot shaft 24. In the case of the embodiment, the opening/closing door 19 is disposed in one of the communication paths 13a, and the other opening/closing door 20 is disposed in the other communication path 13a. However, the opening/closing doors 19 and 20 are supported by the common pivot shaft 24 and pivotably operated by the one actuator 21. The actuator 21 is operated to connect a downstream side of the adsorption unit 10A (or, 10B) to the return pipeline 13c during purification of indoor air using the adsorption unit 10A (or, 10B), and connect a downstream side of the adsorption unit 10B (or, 10A) to the vehicle-outside discharge pipeline 13d during regeneration of the adsorption unit 10B (or, 10A).

In the case of the embodiment, each of the opening/closing doors 19 and 20 has a pair of door pieces a and b connected to form substantially an L shape when seen in a side view. As shown in FIG. 5, the door piece a on one side opens and closes an end portion of the return pipeline 13c, and the door piece b on the other side opens and closes an end portion of the vehicle-outside discharge pipeline 13d. Both of the opening/closing doors 19 and 20 are connected to the pivot shaft 24 with the door pieces a and b thereof being shifted by 90° around the pivot shaft 24. The pivot shaft 24 is disposed in a boundary section between end portions of the return pipeline 13c and the vehicle-outside discharge pipeline 13d.

According to the configuration, when the opening/closing door 19 on the side of one of the communication paths 13a closes the vehicle-outside discharge pipeline 13d and opens the return pipeline 13c, the opening/closing door 20 on the side of the other communication path 13a opens the vehicle-outside discharge pipeline 13d and closes the return pipeline 13c. On the contrary, when the opening/closing door 19 on the side of the one communication path 13a opens the vehicle-outside discharge pipeline 13d and closes the return pipeline 13c, the opening/closing door 20 on the side of the other communication path 13a closes the vehicle-outside discharge pipeline 13d and opens the return pipeline 13c. Accordingly, when the configuration of the embodiment is employed, switching of the flow paths with respect to the return pipeline 13c and the vehicle-outside discharge pipeline 13d of the two communication paths 13a can be performed by an operation of the common actuator 21.

Figure 7:
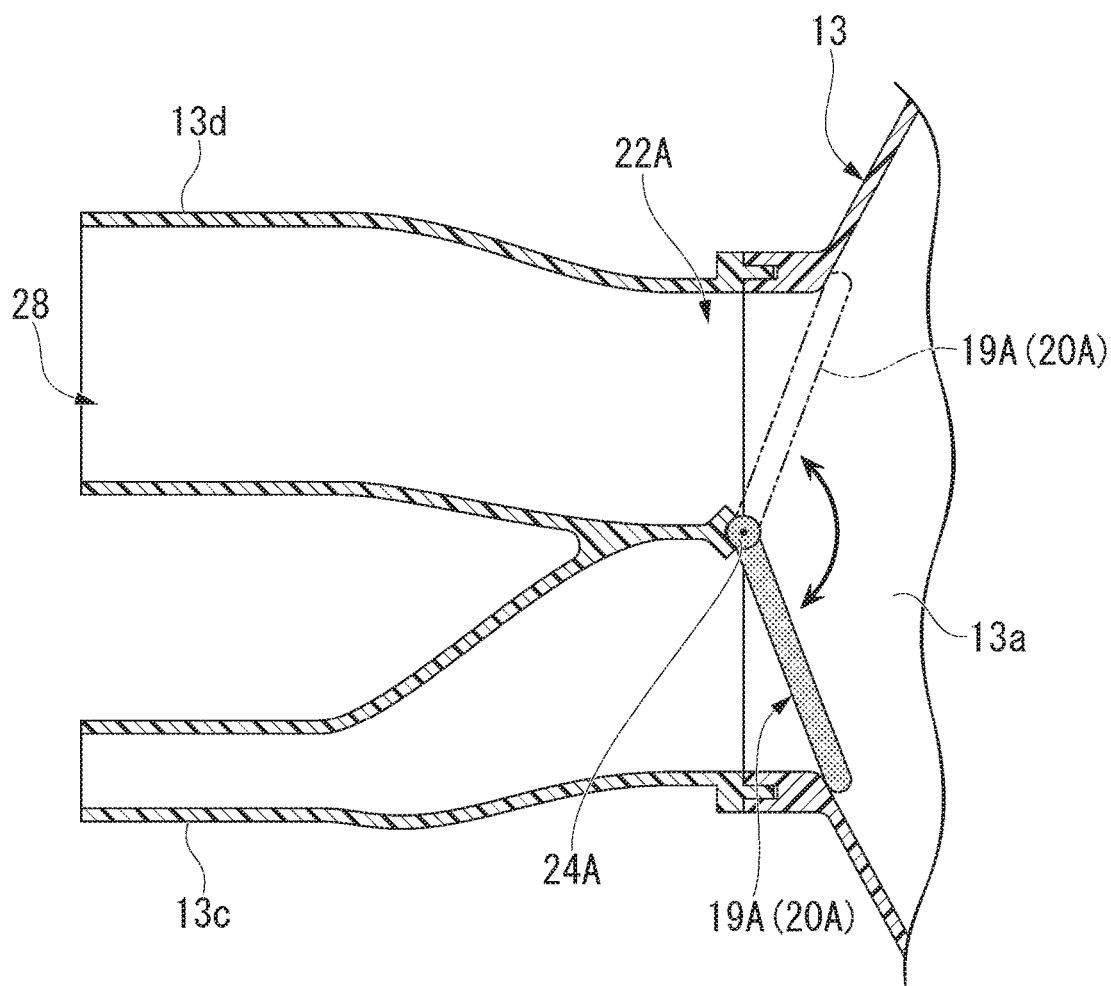
FIG. 7 is a longitudinal cross-sectional view of a portion of an air purification apparatus of a variant downstream from an adsorption unit.
Figure 8:
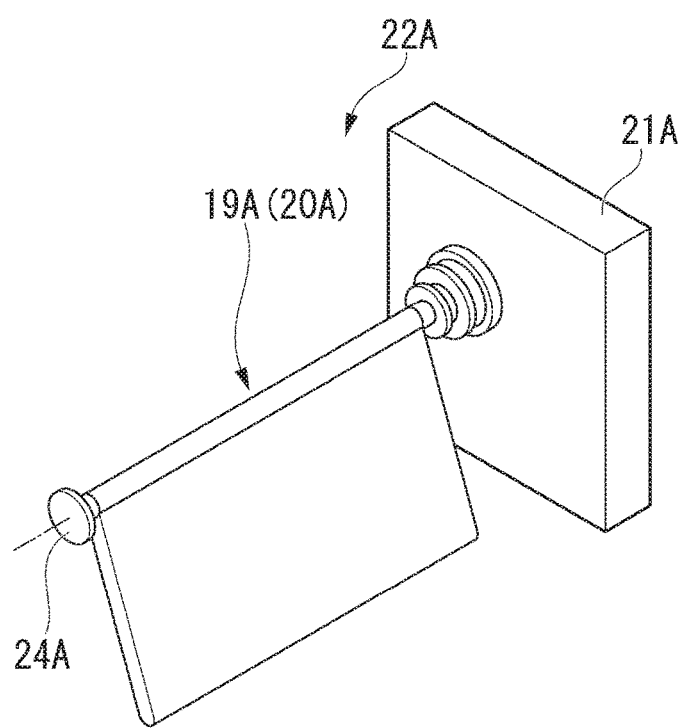
FIG. 8 is a perspective view showing a flow path switching mechanism of a variant.

However, a flow path switching mechanism disposed in each of the communication paths 13a is also able to be operated by an individual actuator 21A like in a variant shown in FIG. 7 and FIG. 8.

FIG. 7 is a cross-sectional view showing details of a flow path switching mechanism 22A of a variant, and FIG. 8 is a perspective view showing components of a flow path switching mechanism 22A of the variant.

In the flow path switching mechanism 22A of the variant, each of opening/closing doors 19A and 20A is constituted by one flat door piece, and each of the opening/closing doors 19A and 20A is connected to a pivot shaft 24A of different actuators 21A. In the case of the variant, the flow path switching mechanism 22A of each of the communication paths 13a is individually operated by the different actuators 21A.

Incidentally, as shown in FIG. 3, the air purification apparatus 1 includes a purification passage 27 and a regeneration passage 28. The purification passage 27 is a passage configured to introduce the air in the passenger compartment into the adsorption unit 10A (or 10B) and return the air obtained by adsorbing and removing purifying target materials (carbon dioxide and water vapor) using the adsorption unit 10A (or 10B) into the passenger compartment through the return pipeline 13c. In addition, the regeneration passage 28 is a passage configured to introduce the air in the passenger compartment as air for regeneration into the adsorption unit 10B (or 10A) and discharge the used air for regeneration that regenerates the adsorption unit 10B (or 10A) to the outside of the vehicle through the vehicle-outside discharge pipeline 13d. However, the purification passage 27 and the regeneration passage 28 are switched between by switching the flow path using the flow path switching mechanism 22 (22A). In the case of the example shown in FIG. 3, the passage that returns air from the return pipeline 13c to the inside of the vehicle through the adsorption unit 10A becomes the purification passage 27, and the passage that discharges air from the vehicle-outside discharge pipeline 13d to the outside of the vehicle through the adsorption unit 10B on the lower side becomes the regeneration passage 28.

In addition, in the case of the embodiment, the purification passage 27 and the regeneration passage 28 share most parts of the adsorption units 10A and 10B on the upstream side, and both of the passages take in the air in the passenger compartment through the same upstream-side duct block 12. However, a ratio of air volumes taken in the adsorption units 10A and 10B is appropriately adjusted through adjustment of an opening degree of the opening/closing door 17 (the air distribution mechanism).

(Operation of Air Purification Apparatus)

The air purification apparatus 1 of the embodiment can parallelly and simultaneously perform purification of the air in the passenger compartment using the adsorption unit 10A (or 10B) on one side and regeneration of the adsorption unit 10B (or 10A) on the other side. Purification of the air in the passenger compartment by the adsorption unit 10A (or 10B) on the one side and regeneration of the adsorption unit 10B (or 10A) on the other side can be switched at every predetermined time. Hereinafter, as shown in FIG. 3, an example of the case in which purification in the passenger compartment is performed by the adsorption unit 10A and regeneration of the adsorption unit 10B is simultaneously performed will be described.

When the air introduction fan 16 is operated, as shown in FIG. 3, the air in the passenger compartment is introduced into the collecting passage 12a of the upstream-side duct block 12 by a suction force of the air introduction fan 16. The air introduced into the collecting passage 12a is distributed into the two branch-off passages 12b according to an opening degree of the opening/closing door 17. Here, the cold/heat supply apparatus 30 is controlled to cool the inside of the branch-off passage 12b on the side in communication with the adsorption unit 10A on one side, and heat the inside of the branch-off passage 12b in communication with the adsorption unit 10B on the other side. In addition, the heating apparatus 18 in the branch-off passage 12b on the side in communication with the adsorption unit 10B on the other side is in a heated state.

The air introduced into the branch-off passage 12b on one side is cooled by the cold/heat supply apparatus 30, and then, introduced into the adsorption unit 10A on one side. In the adsorption unit 10A, the purifying target material in the air containing carbon dioxide and water vapor is adsorbed to the adsorbent. As a result, the air passing through the adsorption unit 10A is purified. The air passing through the adsorption unit 10A is returned into the passenger compartment from the communication path 13a on one side through the return pipeline 13c.

The air flowing into the branch-off passage 12b on the other side is pre-heated by the cold/heat supply apparatus 30, and then, further heated by the heating apparatus 18. The air heated by the heating apparatus 18 is introduced into the adsorption unit 10B on the other side. Since the heated air passes through the adsorption unit 10B, the purifying target material adsorbed in the adsorption unit 10B is scattered in the air, and as a result, the adsorption unit 10B is regenerated. The air (used air for regeneration) passing through the adsorption unit 10B is discharged to the outside of the vehicle from the communication path 13a on the other side through the vehicle-outside discharge pipeline 13d.

Thus, when purification of the air in the passenger compartment by the adsorption unit 10A on one side and regeneration of the adsorption unit 10B on the other side are continued for a predetermined time, changing of an opening degree of the opening/closing door 17 (the air distribution mechanism) on the upstream side, inversion of a cooling/heating direction of the cold/heat supply apparatus 30, stoppage of heating of the heating apparatus 18 in the branch-off passage 12b on one side, starting of heating of the heating apparatus 18 in the branch-off passage 12b on the other side, switching of a flow path by the flow path switching mechanism 22, and the like, are performed. Accordingly, in the same manner as described above, purification of the indoor air by the adsorption unit 10B on the other side and regeneration of the adsorption unit 10A on one side are performed.

Effects of Embodiment

As described above, in the air purification apparatus 1 of the embodiment, the upstream sides of the adsorption units 10A and 10B of the regeneration passage 28 and the purification passage 27 are constituted by the upstream-side duct block 12 (the internal air introduction pipeline) in which both of them introduce the air from the passenger compartment. For this reason, comparing with the case in which a pipeline configured to introduce external air is provided in the purification passage 27, a pipeline structure of the adsorption unit on an intake side can be greatly simplified.

Further, in the air purification apparatus 1 of the embodiment, since the air in the passenger compartment having a relatively high temperature is introduced as the air for regeneration, regeneration efficiency of the adsorption unit can be improved while minimizing consumption of in-vehicle energy such as electric energy or the like.

Figure 9A:
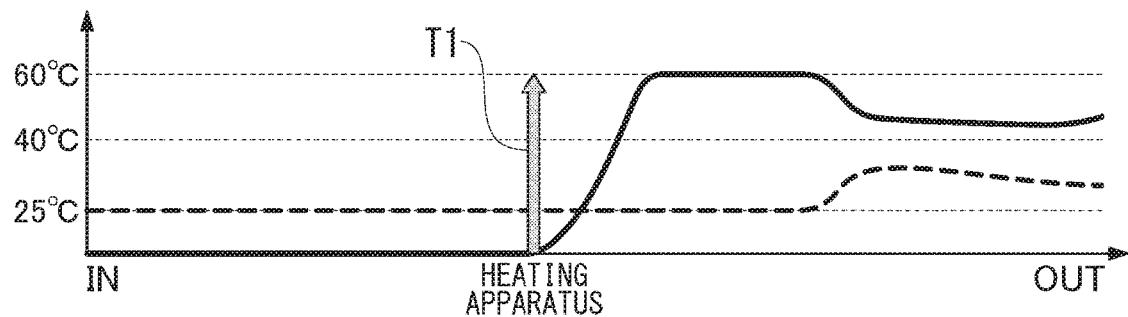
FIG. 9A is a view showing an air temperature at respective positions in a purification passage and a regeneration passage of the air purification apparatus, and showing an air temperature of a reference example.
Figure 9B:
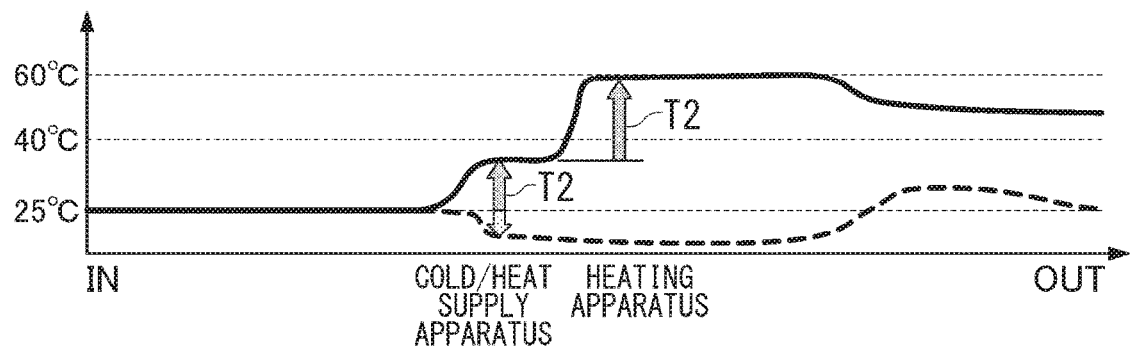
FIG. 9B is a view showing an air temperature at respective positions in the purification passage and the regeneration passage of the air purification apparatus, and showing an air temperature of the first embodiment.

FIG. 9A and FIG. 9B are views showing air temperatures at respective positions in the purification passage 27 and the regeneration passage 28 of the air purification apparatus 1. Further, solid lines in FIG. 9A and FIG. 9B indicate air temperatures in the regeneration passage 28, and dotted lines in FIG. 9A and FIG. 9B indicate air temperatures in the purification passage 27. In addition, FIG. 9A shows air temperatures of a reference example using external air as air for regeneration, and FIG. 9B shows air temperatures in the case of the air purification apparatus 1 of the embodiment.

As will be apparent from FIG. 9A and FIG. 9B, since the air purification apparatus 1 of the embodiment uses the air in the passenger compartment as air for regeneration, a difference (T2+T3) between a required temperature and a base temperature (a temperature when air is suctioned) is smaller than a difference (T1) in the case of the reference example.

Further, T2 in FIG. 9A and FIG. 9B indicates an increase in temperature by the cold/heat supply apparatus 30, and T3 indicates an increase in temperature by the heating apparatus 18.

In addition, in the air purification apparatus 1 of the embodiment, the collecting passage 12a of the upstream-side duct block 12 (the internal air introduction pipeline) is branched off to a plurality of branch-off passages 12b and is connected to the adsorption units 10A and 10B. For this reason, in comparison with the case in which an elongated internal air introduction pipeline is connected to each of the adsorption units 10A and 10B, a space occupied by the pipeline in the vehicle on a suction side of the air purification apparatus 1 can be reduced. In addition, reduction in size and reduction in weight of the air purification apparatus 1 can be achieved as a whole.

Further, in the air purification apparatus 1 of the embodiment, since the air introduction fan 16 is installed at an upstream end of the upstream-side duct block 12, the same air introduction fan 16 can be commonly used in purification of the air in the passenger compartment by the adsorption units 10A and 10B and regeneration of the adsorption units 10A and 10B. Accordingly, by employing such configuration, reduction in the number of parts, reduction in manufacturing costs, and further reduction in size and weight of the device can be achieved.

In addition, in the air purification apparatus 1 of the embodiment, the opening/closing door 17 (the intake distribution mechanism) configured to adjust a ratio of air volumes distributed to the adsorption units 10A and 10B from the collecting passage 12a is disposed on a branch-off section of the upstream-side duct block 12. For this reason, air purification by the adsorption unit 10A (or 10B) on one side and regeneration of the adsorption unit 10B (or 10A) on the other side can be simultaneously performed by appropriately changing a ratio of the indoor air introduced into the adsorption units 10A and 10B using the opening/closing door 17, at a proportion according to the ratio of the air.

Further, in the above-mentioned description, while the case in which air purification by the adsorption unit 10A (or 10B) on one side and regeneration of the adsorption unit 10B (or 10A) on the other side are simultaneously performed has been described, air purification and regeneration can also be performed one by one by setting one of the air volumes distributed to the adsorption unit to 100% and the other to 0%.

In addition, in the air purification apparatus 1 of the embodiment, the heating apparatus 18 configured to heat the air before introduction into the adsorption units 10A and 10B during regeneration of the adsorption units 10A and 10B is installed in each of the branch-off passages 12b of the adsorption units 10A and 10B on an upstream side. For this reason, the air heated can flow in the adsorption units 10A and 10B and regeneration efficiency of the adsorption units 10A and 10B can be further increased by operating the heating apparatus 18 during regeneration of the adsorption units 10A and 10B. Here, since the heating apparatus 18 heats the air in the passenger compartment having a high temperature of a certain level or more, consumption of in-vehicle energy such as electric energy or the like can be minimized.

Further, in the air purification apparatus 1 of the embodiment, the cold/heat supply apparatus 30 configured to heat the air in the branch-off passage 12b on one side and cool the air in the branch-off passage 12b on the other side is installed on the partition wall 15 of the adsorption units 10A and 10B on the upstream side. For this reason, the air in the branch-off passage 12b on the side at which regeneration of the adsorption units 10A and 10B is performed can be heated and the air in the branch-off passage 12b on the side at which adsorption of carbon dioxide and water vapor is performed by the adsorption units 10A and 10B can be cooled by operating the cold/heat supply apparatus 30. Accordingly, when the configuration is employed, adsorption efficiency of carbon dioxide and water vapor by the adsorption units 10A and 10B can be increased while regeneration efficiency of the adsorption units 10A and 10B can be increased.

In addition, in the air purification apparatus 1 of the embodiment, the downstream sides of the adsorption units 10A and 10B can be selectively connected to the return pipeline 13c and the vehicle-outside discharge pipeline 13d by the flow path switching mechanism 22 while the return pipeline 13c and the vehicle-outside discharge pipeline 13d are connected to the downstream sides of the adsorption units 10A and 10B. Then, the flow path switching mechanism 22 is operated by the actuator 21 such that the downstream sides of the adsorption units 10A and 10B are connected to the return pipeline 13c during adsorption by the adsorption units 10A and 10B and the downstream sides of the adsorption units 10A and 10B are connected to the vehicle-outside discharge pipeline 13d during regeneration of the adsorption units 10A and 10B. For this reason, when the air purification apparatus 1 of the embodiment is employed, the used air for regeneration obtained by performing regeneration of the adsorption units 10A and 10B can be discharged to the outside of the vehicle while the air, from which carbon dioxide and water vapor are removed by the adsorption units 10A and 10B, can be returned into the passenger compartment, according to an appropriate operation of the flow path switching mechanism 22 by the actuator 21.

Second Embodiment

Figure 10:
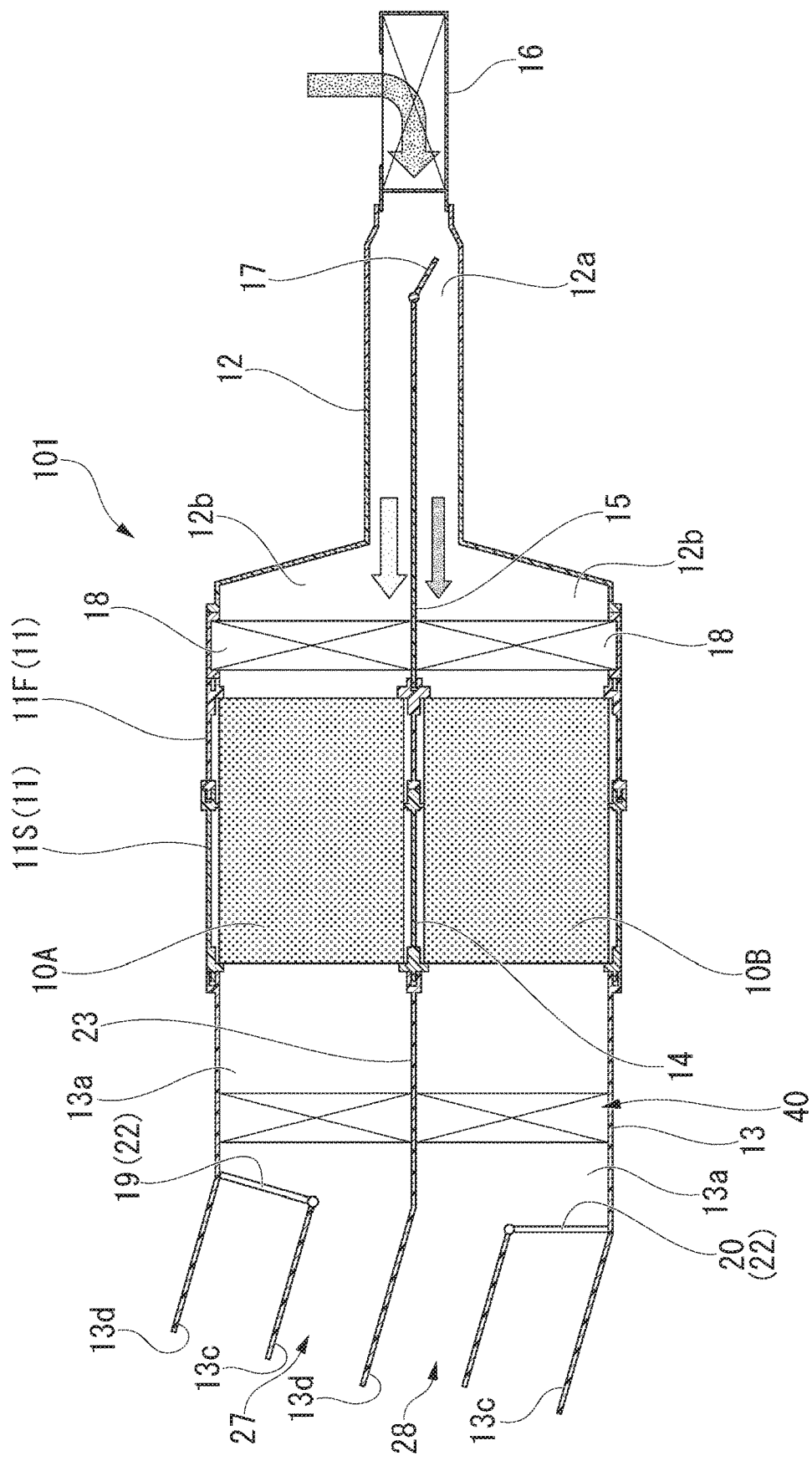
FIG. 10 is a schematic cross-sectional view of an air purification apparatus of a second embodiment.

FIG. 10 is a schematic cross-sectional view of an air purification apparatus 101 of a second embodiment, showing an internal structure of the air purification apparatus 101.

While the air purification apparatus 101 of the second embodiment has substantially the same configuration as that of the first embodiment, the second embodiment is distinguished from the first embodiment in that a cold/heat supply apparatus is not installed on the partition wall 15 of the adsorption units 10A and 10B on an upstream side, and a heat transfer apparatus 40 is installed on the partition wall 23 configured to partition the two communication paths 13a downstream from the adsorption units 10A and 10B.

Figure 11:
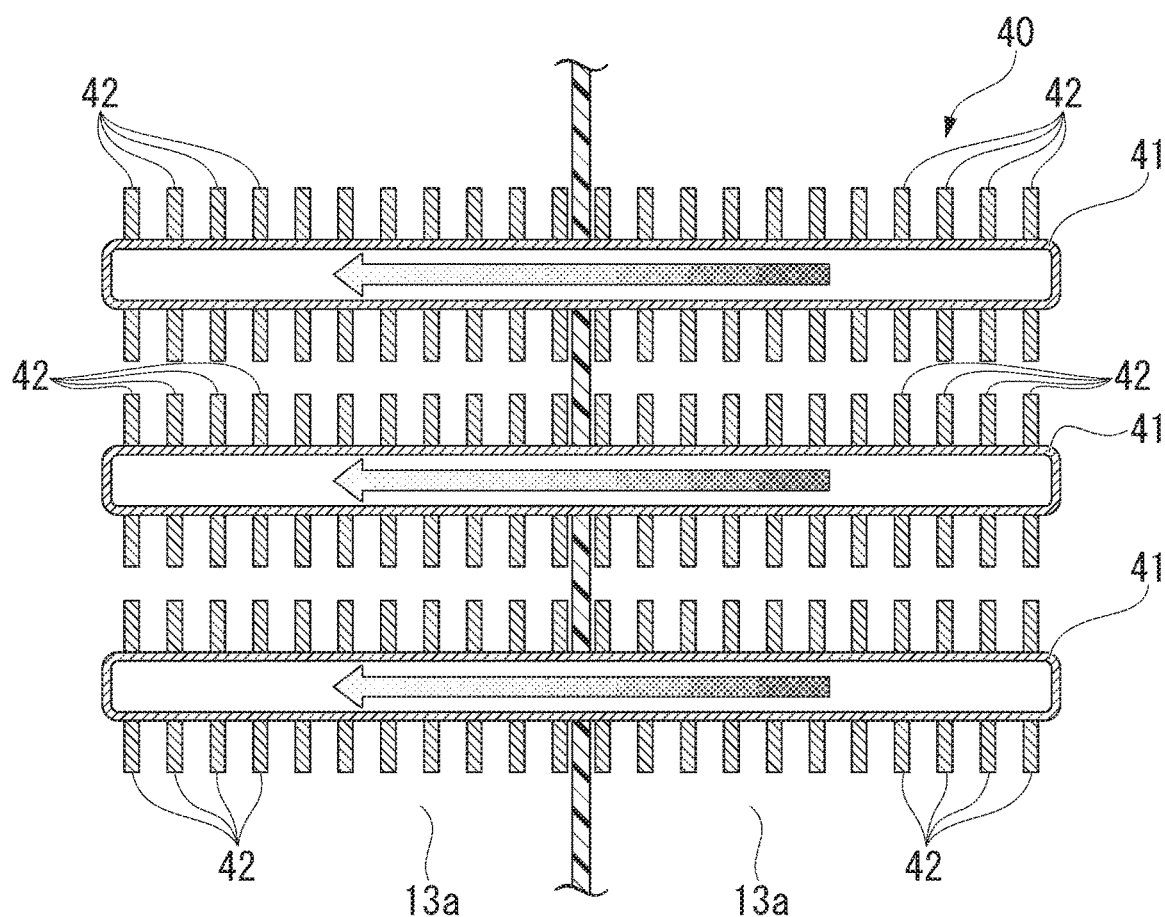
FIG. 11 is a cross-sectional view of a heat transfer apparatus of the second embodiment.

FIG. 11 is a view showing an example of the heat transfer apparatus 40.

For example, as shown in FIG. 11, the heat transfer apparatus 40 is constituted by heat pipes 41 and fins 42. In the heat transfer apparatus 40 shown in FIG. 11, the plurality of heat pipes 41 are installed to pass through the partition wall 23, and the plurality of fins 42 protrude from outer surfaces of the heat pipes 41 facing the communication paths 13a. The fins 42 exposed to the air in the communication paths 13a on a high temperature side transmit heat of the air in the communication paths 13a to one end sides of the heat pipes 41, move the heat to the other end sides of the heat pipes 41 using heat transfer by the heat pipes 41, and transmit the heat to the air in the communication paths 13a on a low temperature side through the fins 42 on the other end side.

Further, the heat transfer apparatus 40 is not limited to the above-mentioned configuration, and for example, a configuration constituted by a graphite sheet and a plurality of fins or a configuration constituted by a tube filled with a medium having good heat transfer efficiency and a plurality of fins may be provided.

Figure 12A:
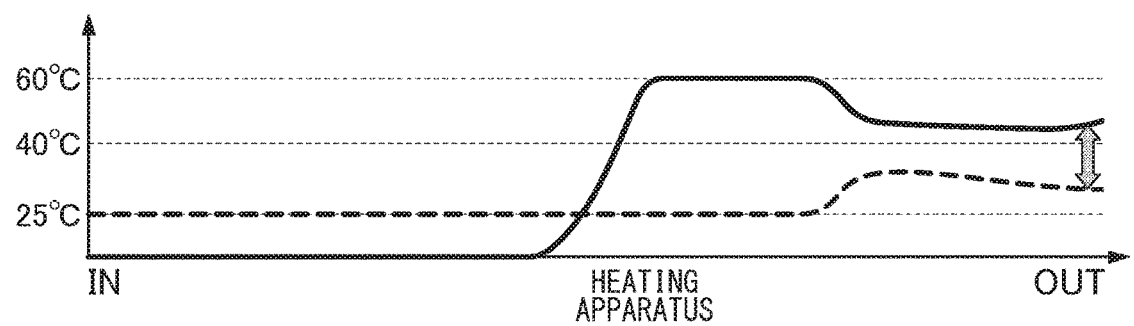
FIG. 12A is a view showing an air temperature at respective positions in a purification passage and a regeneration passage of the air purification apparatus, and showing an air temperature of a reference example.
Figure 12B:
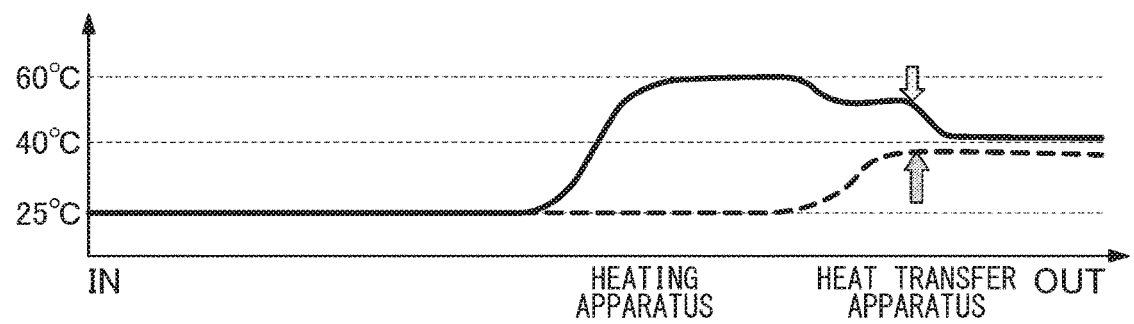
FIG. 12B is a view showing an air temperature at respective positions in the purification passage and the regeneration passage of the air purification apparatus, and showing an air temperature of the second embodiment.

FIG. 12A and FIG. 12B are views showing air temperatures at respective positions in the purification passage 27 and the regeneration passage 28 of the air purification apparatus 101. Further, solid lines in FIG. 12A and FIG. 12B indicate air temperatures in the regeneration passage 28, and dotted lines in FIG. 12A and FIG. 12B indicate air temperatures in the purification passage 27. FIG. 12A shows air temperatures of a reference example using external air as air for regeneration, and FIG. 12B shows air temperature in the case of the air purification apparatus 101 in the embodiment.

As will be apparent from FIG. 12A and FIG. 12B, in the air purification apparatus 101 of the embodiment, since the air in the passenger compartment is used as the air for regeneration, a difference between the required temperature and the base temperature is smaller than that in the case of the reference example. In addition, in the air purification apparatus 101 of the embodiment, since the heat transfer apparatus 40 is installed at the partition wall 23 downstream from the adsorption units 10A and 10B, heat of the air in the communication path 13a on the side of the regeneration passage 28 can be transmitted to the air in the communication path 13a on the side of the purification passage 27 through the heat transfer apparatus 40. Accordingly, the temperature of the air in the communication path 13a on the side of the regeneration passage 28 is decreased, and reversely, the temperature of the air in the communication path 13a on the side of the purification passage 27 is increased.

As described above, in the air purification apparatus 101 of the embodiment, the heat of the used air for regeneration before discharge to the outside of the vehicle can be transmitted to the purified air returned into the passenger compartment through the heat transfer apparatus 40. For this reason, a heat quantity of the air cooled while being returned into the passenger compartment through the return pipeline 13c can be supplemented by the heat transmitted through the heat transfer apparatus 40. Accordingly, when the air purification apparatus 101 of the embodiment is employed, the heat discharged to the outside of the vehicle can be effectively used, and unnecessary consumption of in-vehicle energy can be further minimized.

Third Embodiment

Figure 13:
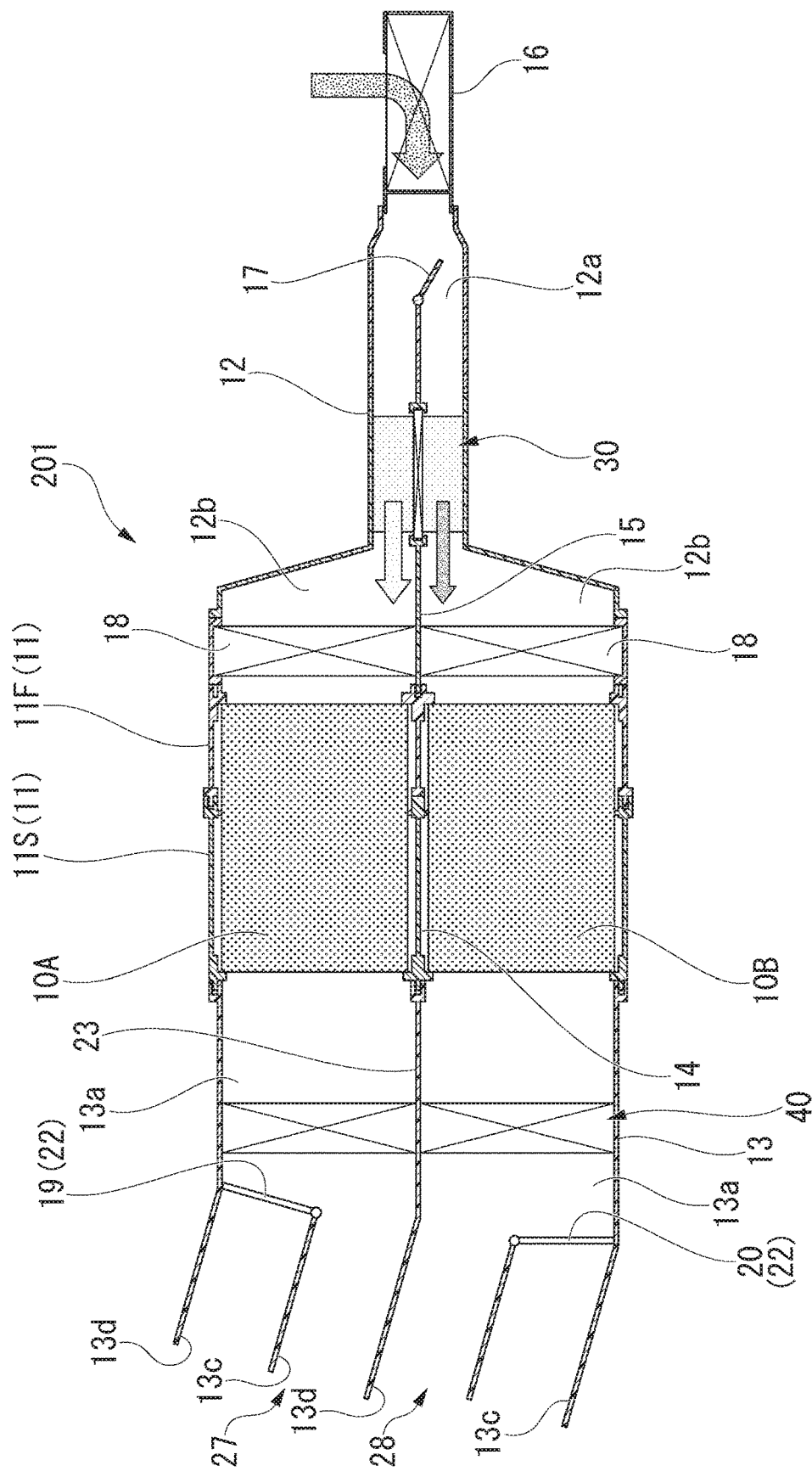
FIG. 13 is a schematic cross-sectional view of an air purification apparatus of a third embodiment.

FIG. 13 is a schematic cross-sectional view of an air purification apparatus 201 of a third embodiment, showing an internal structure of the air purification apparatus 201.

The air purification apparatus 201 of the third embodiment has a configuration in which the cold/heat supply apparatus 30 is added to the air purification apparatus 101 of the second embodiment. The cold/heat supply apparatus 30 is installed at the partition wall 15 upstream from the adsorption units 10A and 10B, the air in the branch-off passage 12b on one side is heated, and the air in the branch-off passage 12b on the other side is cooled.

Figure 14:
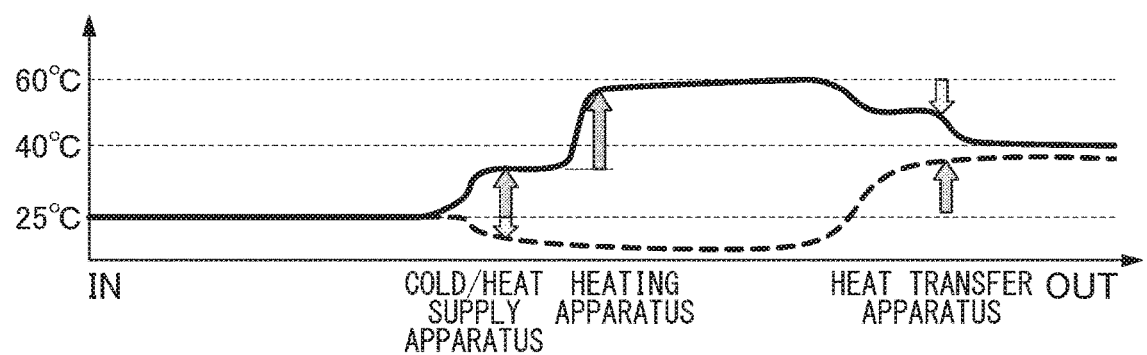
FIG. 14 is a view showing an air temperature at respective positions in a purification passage and a regeneration passage of the air purification apparatus of the third embodiment.

FIG. 14 is a view showing air temperatures at respective positions in the purification passage 27 and the regeneration passage 28 of the air purification apparatus 201. Solid lines in FIG. 14 indicate air temperatures in the regeneration passage 28, and dotted lines in FIG. 14 indicate air temperatures in the purification passage 27.

As will be apparent from the same drawing, like the second embodiment, in the air purification apparatus 201 of the embodiment, a difference between the required temperature and the base temperature during regeneration of the adsorption units 10A and 10B can be reduced, and the heat of the air in the communication path 13a on the side of the regeneration passage 28 can be transmitted to the air in the communication path 13a on the side of the purification passage 27 through the heat transfer apparatus 40.

Further, in the air purification apparatus 201 of the embodiment, since the cold/heat supply apparatus 30 is installed at the partition wall 15 upstream from the adsorption units 10A and 10B, the air in the branch-off passage 12b on the side at which regeneration of the adsorption units 10A and 10B is performed can be heated, and the air in the branch-off passage 12b on the side at which adsorption of carbon dioxide and water vapor is performed by the adsorption units 10A and 10B can be cooled. Accordingly, when the air purification apparatus 201 of the embodiment is employed, adsorption efficiency of carbon dioxide and water vapor by the adsorption units 10A and 10B can also be enhanced.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An air purification apparatus for a vehicle comprising:
   a plurality of adsorption units configured to adsorb carbon dioxide and water vapor in air;
   a purification passage configured to introduce air from a passenger compartment into a first adsorption unit, of the plurality of adsorption units, and to return air, from which carbon dioxide and water vapor have been adsorbed and removed by the first adsorption unit, to the passenger compartment; and a regeneration passage configured to introduce air for regeneration into a second adsorption unit, of the plurality of adsorption units, and to discharge used air for regeneration obtained by regenerating the second adsorption unit outside of the vehicle, wherein an upstream side of the regeneration passage and an upstream side of the purification passage, upstream from the plurality of adsorption units, are constituted by an internal air introduction pipeline configured to introduce air from the passenger compartment into the plurality of adsorption units, wherein the internal air introduction pipeline branches into a plurality of parts that are connected to the plurality of adsorption units, and wherein an intake distribution mechanism configured to adjust a ratio between air volumes distributed to respective adsorption units from the internal air introduction pipeline is disposed on a branch-off section of the internal air introduction pipeline.

2. The air purification apparatus for a vehicle according to claim 1, wherein an air introduction fan configured to introduce air into the passenger compartment is disposed in an upstream section of the internal air introduction pipeline.

3. The air purification apparatus for a vehicle according to claim 1, wherein an upstream side of the plurality of adsorption units are partitioned into two branch-off passages by a partition wall, and a plurality of heating apparatus configured to heat the air from the passenger compartment before introduction into the plurality of adsorption units, during regeneration of the plurality of adsorption units, is installed in the branch-off passages.

4. The air purification apparatus for a vehicle according to claim 1, wherein the upstream side of the plurality of adsorption units are partitioned into two branch-off passages by a partition wall, and a cold/heat supply apparatus configured to heat air in a first branch-off passage on one side and cool the air in a second branch-off passage on the other side is installed on the partition wall.

5. The air purification apparatus for a vehicle according to claim 1, wherein a return pipeline that constitutes a part of the purification passage and a vehicle-outside discharge pipeline that constitutes a part of the regeneration passage are selectively connected to a downstream side of each of the plurality of adsorption units by a flow path switching mechanism configured to selectively connect the downstream side of each of the plurality of adsorption units to any one of the return pipeline and the vehicle-outside discharge pipeline.

6. The air purification apparatus for a vehicle according to claim 5, wherein the flow path switching mechanism comprises an actuator operated to connect the downstream side of the plurality of adsorption units to the return pipeline during adsorption by the plurality of adsorption units and connect the downstream side of the plurality of adsorption units to the vehicle-outside discharge pipeline during regeneration of the plurality of adsorption units.

7. The air purification apparatus for a vehicle according to claim 1, wherein downstream sides of the plurality of adsorption units are partitioned from each other by a partition wall, and a heat transfer apparatus configured to transmit heat of air on a downstream side of one of the plurality of adsorption units to air on a downstream side of another one of the plurality of adsorption units is installed on the partition wall.

8. The air purification apparatus for a vehicle according to claim 7, wherein the heat transfer apparatus is configured to transmit heat of used air for regeneration, which has performed regeneration of the plurality of adsorption units and which is before being discharged to the outside of the vehicle, to air which has performed adsorption by the plurality of adsorption units and which is before being returned into the passenger compartment.

9. An air purification apparatus for a vehicle comprising:
a plurality of adsorption units configured to adsorb carbon dioxide and water vapor in air;
a purification passage configured to introduce air from a passenger compartment into a first adsorption unit, of the plurality of adsorption units, and to return air, from which carbon dioxide and water vapor have been adsorbed and removed by the first adsorption unit, to the passenger compartment; and
a regeneration passage configured to introduce air for regeneration into a second adsorption unit, of the plurality of adsorption units, and to discharge used air for regeneration obtained by regenerating the second adsorption unit outside of the vehicle,
wherein an upstream side of the regeneration passage and an upstream side the purification passage, upstream from the plurality of adsorption units, are constituted by an internal air introduction pipeline configured to introduce air from the passenger compartment into the plurality of adsorption units,
wherein the internal air introduction pipeline branches into a plurality of parts that are connected to the plurality of adsorption units,
wherein an upstream side of the plurality of adsorption units are partitioned into two branch-off passages by a partition wall, and
wherein a cold/heat supply apparatus configured to heat air in a first branch-off passage on one side and cool air in a second branch-off passage on the other side is installed on the partition wall.

10. An air purification apparatus for a vehicle comprising:
a plurality of adsorption units configured to adsorb carbon dioxide and water vapor in air;
a purification passage configured to introduce air from a passenger compartment into a first adsorption unit, of the plurality of adsorption units, and to return air, from which carbon dioxide and water vapor have been adsorbed and removed by the first adsorption unit, to the passenger compartment; and
a regeneration passage configured to introduce air for regeneration into a second adsorption unit, of the plurality of adsorption units, and to discharge used air for regeneration obtained by regenerating the second adsorption unit outside of the vehicle,
wherein an upstream side of the regeneration passage and an upstream side the purification passage, upstream from the plurality of adsorption units, are constituted by an internal air introduction pipeline configured to introduce air from the passenger compartment into the plurality of adsorption units,
wherein the internal air introduction pipeline branches into a plurality of parts that are connected to the plurality of adsorption units, and
wherein a return pipeline that constitutes a part of the purification passage and a vehicle-outside discharge pipeline that constitutes a part of the regeneration passage are selectively connected to a downstream side of each of the plurality of adsorption units by a flow path switching mechanism configured to selectively connect the downstream side of each of the plurality of adsorption units to any one of the return pipeline and the vehicle-outside discharge pipeline.

11. The air purification apparatus for a vehicle according to claim 10, wherein the flow path switching mechanism comprises an actuator operated to connect the downstream side of the plurality of adsorption units to the return pipeline during adsorption by the plurality of adsorption units and connect the downstream side of the plurality of adsorption units to the vehicle-outside discharge pipeline during regeneration of the plurality of adsorption units.

* * * * *

EX PARTE REEXAMINATION CERTIFICATE (12640th)
United States Patent
Matsumoto et al.

(10) Number: US 11,554,644 C1
(45) Certificate Issued: Jul. 11, 2024

(54) AIR PURIFICATION APPARATUS FOR VEHICLE

(71) Applicant: HONDA MOTOR CO., LTD., Tokyo (JP)

(72) Inventors: Subaru Matsumoto, Wako (JP); Shinji Kakizaki, Wako (JP)

(73) Assignee: HONDA MOTOR CO., LTD., Tokyo (JP)

Reexamination Request:
No. 90/019,373, Jan. 11, 2024

Reexamination Certificate for:
Patent No.: 11,554,644
Issued: Jan. 17, 2023
Appl. No.: 16/718,229
Filed: Dec. 18, 2019

(30) Foreign Application Priority Data

Jan. 16, 2019 (JP) ................ 2019-005243

(51) Int. Cl.
*B60H 3/06* (2006.01)
*B01D 53/04* (2006.01)
*B60H 3/00* (2006.01)

(52) U.S. Cl.
CPC ........... *B60H 3/0658* (2013.01); *B01D 53/04* (2013.01); *B60H 3/0035* (2013.01); *B01D 2253/102* (2013.01); *B01D 2259/4566* (2013.01)

(58) Field of Classification Search
None
See application file for complete search history.

(56) References Cited

To view the complete listing of prior art documents cited during the proceeding for Reexamination Control Number 90/019,373, please refer to the USPTO's Patent Electronic System.

*Primary Examiner* — Krisanne M Jastrzab

(57) ABSTRACT

An air purification apparatus includes an adsorption unit, a purification passage, and a regeneration passage. The adsorption unit adsorbs carbon dioxide and water vapor in air. The purification passage introduces air in a passenger compartment into the adsorption unit, and returns air, from which the carbon dioxide and the water vapor are adsorbed and removed by the adsorption unit, into the passenger compartment. The regeneration passage introduces air for regeneration into the adsorption unit, and discharges used air for regeneration obtained by regenerating the adsorption unit to an outside of the vehicle. An upstream side of the adsorption unit of the regeneration passage and the purification passage is constituted by an internal air introduction pipeline configured to introduce air from the passenger compartment.

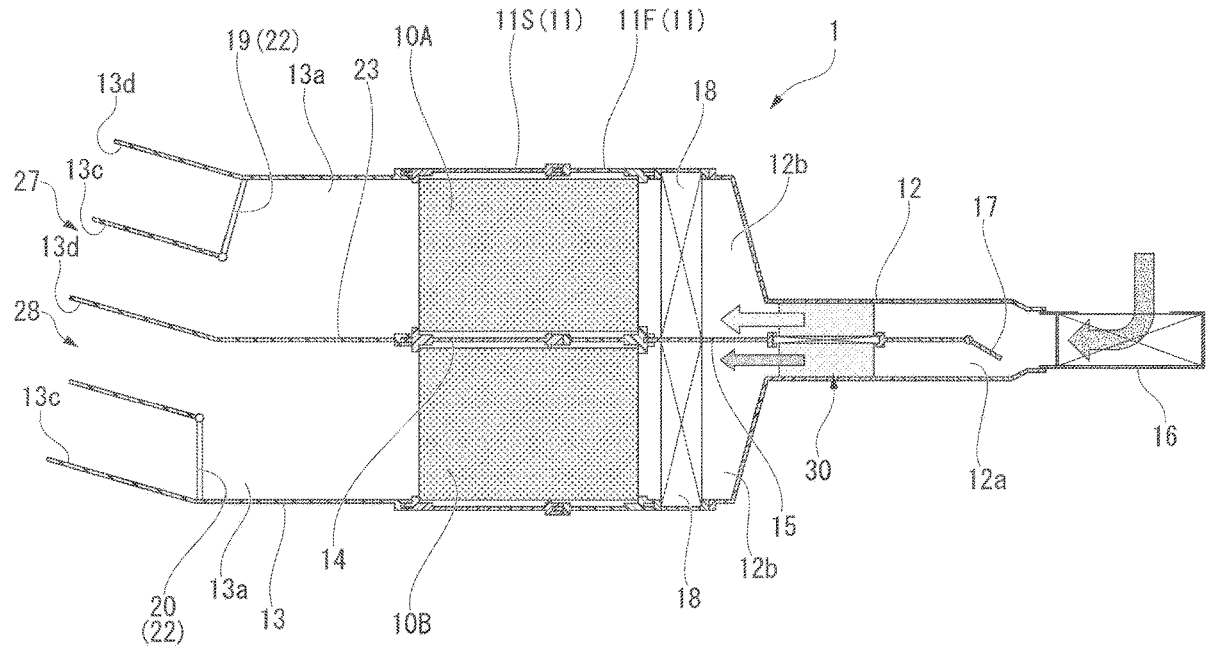

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1-11 is confirmed.

\* \* \* \* \*